J. ARNST.
LISTING INDICATOR.
APPLICATION FILED FEB. 8, 1911.
1,003,863.
Patented Sept. 19, 1911.
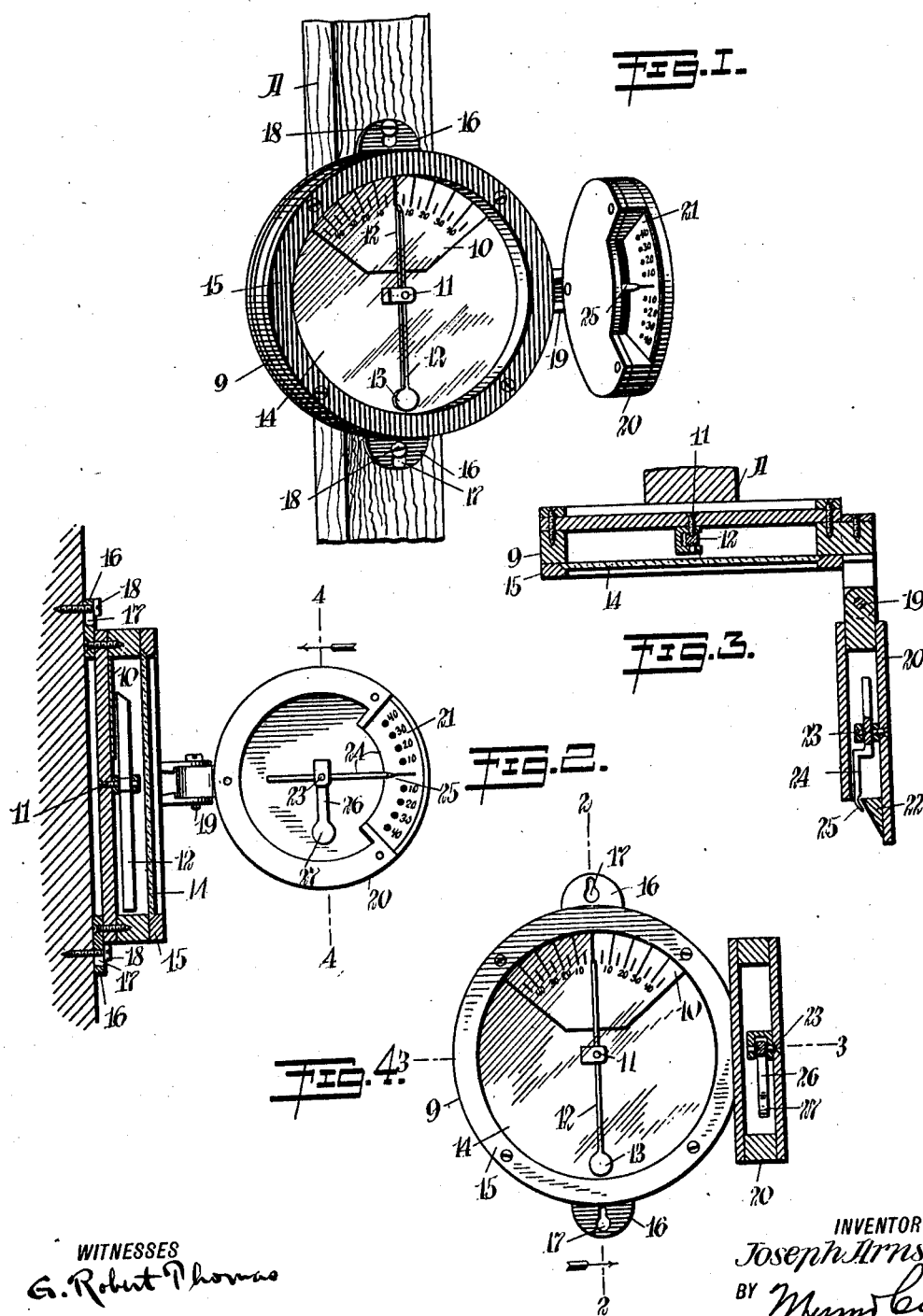
WITNESSES
G. Robert Thomas
C. F. Murdock
INVENTOR
Joseph Arnst
BY Munn & Co.
ATTORNEYS

UNITED STATES PATENT OFFICE.

JOSEPH ARNST, OF CHICAGO, ILLINOIS.

LISTING-INDICATOR.

1,003,863.  Specification of Letters Patent. Patented Sept. 19, 1911.

Application filed February 8, 1911. Serial No. 607,247.

*To all whom it may concern:*

Be it known that I, JOSEPH ARNST, a citizen of the United States, and a resident of Chicago, in the county of Cook and State of Illinois, have invented a new and Improved Listing-Indicator, of which the following is a full, clear, and exact description.

Among the principal objects which the present invention has in view are: to provide an instrument of the character mentioned with indicators having visible scales and indicating members movable thereover to show the lateral list of such a machine as an aeroplane, and simultaneously the pitch of said aeroplane on its median transverse axis; to provide an instrument of the character mentioned, the bodies of the said index members being arranged in vertical planes, said planes being perpendicular; and to provide a construction for the indicator whereby the same may be folded into compact form.

One embodiment of the present invention is disclosed in the structure illustrated in the accompanying drawings, in which like characters of reference denote corresponding parts in all the views, and in which—

Figure 1 is a perspective view of an indicator constructed and arranged in accordance with the present invention, the same being shown in conjunction with a stanchion for an aeroplane; Fig. 2 is a vertical section of the indicator taken on the line 2—2 in Fig. 4; Fig. 3 is a horizontal section taken on the line 3—3 in Fig. 4; and Fig. 4 is a vertical section taken on the line 4—4 in Fig. 2.

The present invention is an improvement of the structure disclosed in an application for Patent No. 580,367, filed by me in the United States Patent Office September 13, 1910, for listing indicators, to which application cross reference is here made.

As shown in the accompanying drawings the casing 9 is provided with a scale sheet 10, and centrally mounted on a pivot 11 is a needle 12. The needle 12 is plumbed by means of a weight 13. The pocket within which the needle, pivot and scale sheet are mounted is covered by a glass 14 which is held in position by a clamp ring 15. The casing 9 is provided with two hanging tabs 16, 16. The hanging tabs 16 are each provided with an eyelet 17 to receive a screw 18. The screws 18 are disposed accurately in line parallel with the vertical center of the aeroplane. Care is exercised in the placing of the screws so that the deflection of the needle on the scale sheet to the right or left indicates, by the degree markings on the said sheet, the deflection of the aeroplane structure in its lateral list.

Hingedly connected to the casing 9 by a hinge screw 19 is a smaller casing 20. The casing 20 is provided with a vertically disposed scale sheet 21, and the said casing has a beveled bed 22 formed on the side to receive the said scale sheet. The bevel of the bed 22 which bears the scale sheet 21 is such that the figures marked thereon, and the end of the needle which plays thereover, are visible from a station directly in front of the casing 9. Within the casing 20, pivotally mounted on a pivot 23, is a needle 24. The pointer end 25 of the needle 24 is bent to extend over the surface of the scale sheet 21, as shown best in Figs. 1 and 3. Accurately extended from the body of the needle 24, and depending therefrom, is a weighted plumb rod 26, having at the end thereof a weight member 27. In mounting both of the needles care is taken that the pivots shall be freely acting so that the needles are disposed to answer sensitively to the throw of the weight members 13 and 27.

When in use the two casings are disposed as shown in Fig. 1 of the drawings. When the instrument is removed from the stanchion A by being lifted off the screws 18, 18, the two cases are folded together face to face, and in this position may readily and conveniently be carried in the pocket.

In the operation of the invention it will be seen that the aviator, when seated in front of the casing 9, which, in mounting the instrument is disposed so as to present its face to the aviator's seat, is enabled to simultaneously read the position of the pointer end 25 of the needle 24 on the scale sheet 21. The information thus simultaneously gained apprises the aviator of the tilt of the machine in its longitudinal extension and the list of the machine in its transverse extension.

Having thus described my invention, what I claim as new and desire to secure by Letters Patent is:—

A listing indicator, comprising a plurality of hingedly connected casings; a vertically disposed gravity plumbed needle pivotally mounted in one of said casings; a scale sheet fixedly mounted in said casing adjacent the pointer end of said needle; a T-shaped needle horizontally extended and pivotally mounted in the second casing; a gravity plumbed extension fixedly connected with said needle for maintaining the same in horizontal extension; and a conical scale sheet mounted on the edge of said second casing in position to be exposed to view from the view point of the scale sheet in the first mentioned casing.

In testimony whereof I have signed my name to this specification in the presence of two subscribing witnesses.

JOSEPH ARNST.

Witnesses:
  GEO. J. KUNTZE,
  FRANK D. HEASLYS.

Copies of this patent may be obtained for five cents each, by addressing the "Commissioner of Patents, Washington, D. C."